US012462836B1

(12) United States Patent
Wheelwright et al.

(10) Patent No.: US 12,462,836 B1
(45) Date of Patent: Nov. 4, 2025

(54) SPRING SUSPENSION WITH INDEPENDENT READER AND WRITER FOLLOWING ACTUATOR

(71) Applicant: International Business Machines Corporation, Armonk, NY (US)

(72) Inventors: Evan Wheelwright, Tucson, AZ (US); David Harper, Vail, AZ (US); Chase Alan Steeves, Tucson, AZ (US); Kevin Bruce Judd, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/978,406

(22) Filed: Dec. 12, 2024

(51) Int. Cl.
  *G11B 5/55* (2006.01)
  *G11B 5/48* (2006.01)
(52) U.S. Cl.
  CPC .......... *G11B 5/5504* (2013.01); *G11B 5/4893* (2013.01)
(58) Field of Classification Search
  None
  See application file for complete search history.

(56) References Cited

U.S. PATENT DOCUMENTS

| | | | |
|---|---|---|---|
| 4,203,606 A | 5/1980 | Obata et al. | |
| 4,716,483 A | 12/1987 | Walsh | |
| 4,870,518 A | 9/1989 | Thompson et al. | |
| 5,270,887 A | 12/1993 | Edwards et al. | |
| 5,379,170 A | 1/1995 | Schwarz | |
| 5,450,257 A | 9/1995 | Tran et al. | |
| 5,508,865 A | 4/1996 | La et al. | |
| 5,638,237 A | 6/1997 | Phipps et al. | |
| 5,726,834 A | 3/1998 | Eckberg et al. | |
| 6,075,678 A | 6/2000 | Saliba | |
| 7,342,738 B1 | 3/2008 | Anderson et al. | |
| 7,459,835 B1 * | 12/2008 | Mei | G11B 5/5552 310/330 |
| 8,154,811 B2 | 4/2012 | Barsotti et al. | |
| 8,184,394 B2 | 5/2012 | Poorman et al. | |
| 11,894,030 B2 | 2/2024 | Biskeborn | |
| 11,935,563 B2 | 3/2024 | Noda et al. | |
| 11,990,154 B1 | 5/2024 | Sakagami et al. | |
| 11,990,164 B1 | 5/2024 | Kuroki et al. | |

(Continued)

FOREIGN PATENT DOCUMENTS

| | | |
|---|---|---|
| EP | 0364263 A2 | 4/1990 |
| WO | 2003/105133 A1 | 12/2003 |

OTHER PUBLICATIONS

Boettcher et al., "Dynamic Modeling and Control of a Piezo-Electric Dual-Stage Tape Servo Actuator," IEEE transaction on Magnetics, Jul. 2009, pp. 3017-3024, vol. 45, No. 7, https://web.eng.ucsd.edu/mae/groups/callafon/research/publications/2009/IEEETonM1.pdf.

(Continued)

*Primary Examiner* — Peter Vincent Agustin
(74) *Attorney, Agent, or Firm* — Tihon Poltavets

(57) ABSTRACT

An apparatus includes a top section, a middle section, and a bottom section of a spring actuator for a tape drive that form a C-shape of the spring actuator. The middle section includes three flexor columns, where a first writer module is bonded to a first flexor column from the three flexor columns, a reader module is bonded to a second flexor column from the three flexor columns, and a second writer module is bonded to a third flexor column from the three flexor columns.

25 Claims, 13 Drawing Sheets

(56) References Cited

U.S. PATENT DOCUMENTS

| | | | |
|---|---|---|---|
| 12,266,387 B1* | 4/2025 | Lantz | G11B 5/584 |
| 2001/0015866 A1* | 8/2001 | Nakagawa | G11B 5/5552 360/78.12 |
| 2002/0122268 A1* | 9/2002 | Bement | G11B 5/4826 |
| 2003/0202291 A1* | 10/2003 | Pan | G11B 5/56 |
| 2004/0123448 A1 | 7/2004 | Nguyen et al. | |
| 2004/0184195 A1 | 9/2004 | Nayak et al. | |
| 2004/0212916 A1 | 10/2004 | Nakao et al. | |
| 2005/0081368 A1 | 4/2005 | Yao et al. | |
| 2005/0099736 A1* | 5/2005 | Utsunomiya | G11B 5/4826 360/294.4 |
| 2005/0219756 A1 | 10/2005 | Dugas et al. | |
| 2006/0098331 A1 | 5/2006 | McCormack et al. | |
| 2007/0053110 A1 | 3/2007 | Harper | |
| 2007/0165444 A1* | 7/2007 | Culver | G11B 5/127 |
| 2012/0206832 A1 | 8/2012 | Hamidi et al. | |
| 2014/0133053 A1* | 5/2014 | Liu | G11B 5/4806 360/246.1 |
| 2015/0248915 A1 | 9/2015 | Haeberle et al. | |
| 2017/0092312 A1 | 3/2017 | Harper | |
| 2020/0258544 A1 | 8/2020 | Kobayashi | |
| 2025/0182785 A1 | 6/2025 | Lantz et al. | |

OTHER PUBLICATIONS

Raeymaekers et al., "Design of a dual stage actuator tape head with high-bandwidth track following capability," Microsyst Technology, 2009, Feb. 19, 2009, pp. 1525-1529, https://link.springer.com/article/10.1007/s00542-009-0800-y.

United States Non-Final Rejection dated Sep. 6, 2024, 9 pages, U.S. Appl. No. 18/524,046.

United States Notice of Allowance dated Jan. 31, 2025, 7 pages, in U.S. Appl. No. 18/524,046.

United States Non-Final Rejection, dated Jul. 16, 2025, 15 pages, U.S. Appl. No. 18/524,061.

* cited by examiner

SPRING SUSPENSION WITH INDEPENDENT READER AND WRITER FOLLOWING ACTUATOR

BACKGROUND

This disclosure relates generally to tape drives, and in particular, to a spring tape track with independent reader and writer following actuator for tape drives.

A tape drive is a data storage device that reads and writes data on a magnetic tape. The areal density and capacity gains in recent generations of tape drives have been primarily achieved through track density scaling and the trend is set to continue for future generations of tape drives. The performance of the track following servo system and the tape dimensional stability (TDS) servo system are key to enabling track density scaling.

SUMMARY

One aspect of an embodiment of the present invention discloses an apparatus for a spring actuator, the apparatus comprising a top section, a middle section, and a bottom section of a spring actuator form a C-shape of the spring actuator. The apparatus further comprising the middle section includes three flexor columns, wherein a first writer module is bonded to a first flexor column from the three flexor columns, a reader module is bonded to a second flexor column from the three flexor columns, and a second writer module is bonded to a third flexor column from the three flexor columns

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

Figure 1:
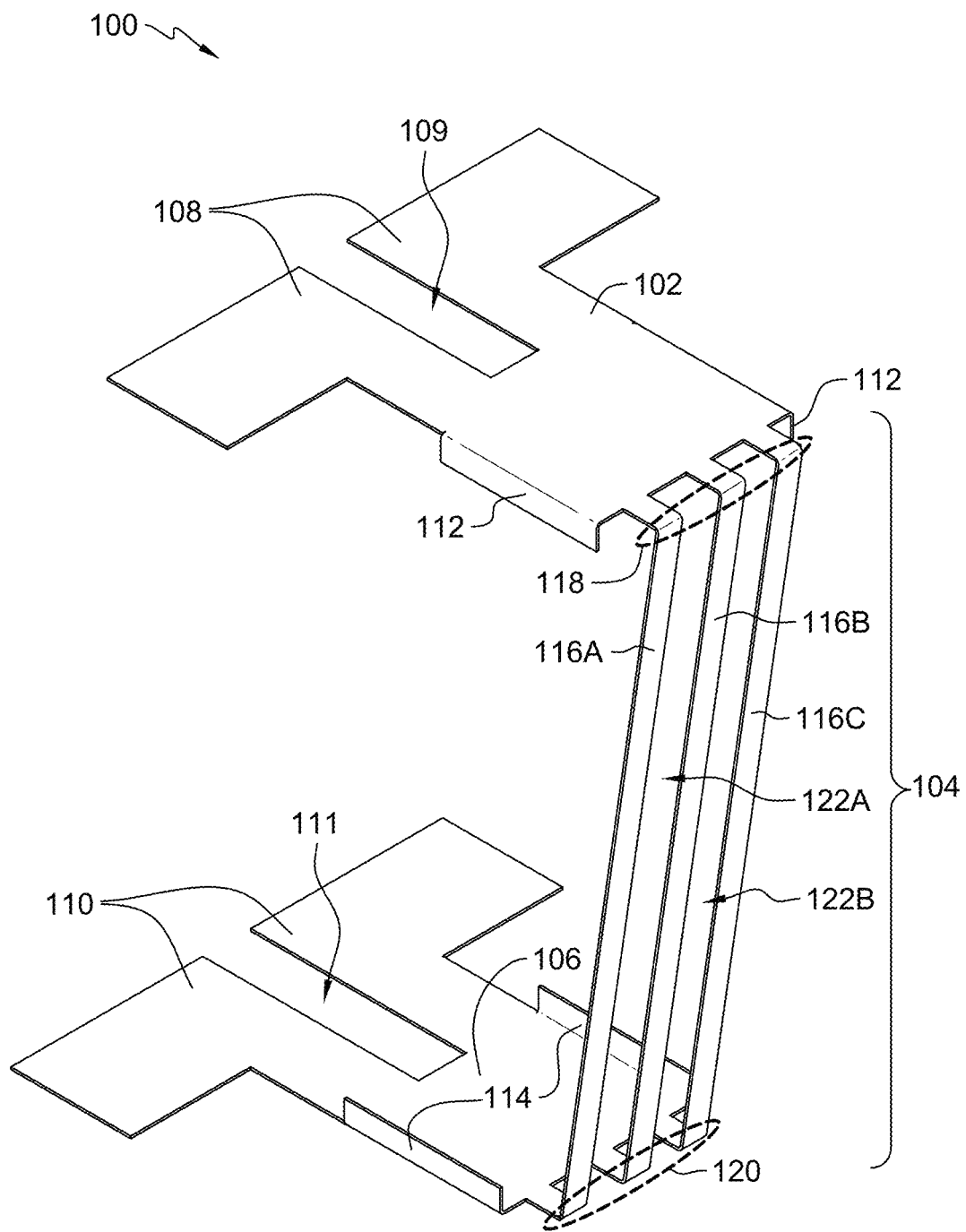
FIG. 1 depicts a three-dimensional view of a spring actuator with three flexor columns, in accordance with an embodiment of the present invention.

It will be appreciated that for simplicity and clarity purpose, elements shown in the drawings have not necessarily been drawn to scale. Further, and if applicable, in various functional block diagrams, two connected devices and/or elements may not necessarily be illustrated as being connected. In some other instances, grouping of certain elements in a functional block diagram may be solely for the purpose of description and may not necessarily imply that they are in a single physical entity, or they are embodied in a single physical entity.

DETAILED DESCRIPTION

According to an aspect of the invention there is provided an apparatus that includes a top section, a middle section, and a bottom section of a spring actuator form a C-shape of the spring actuator. The middle section includes three flexor columns, where a first writer module is bonded to a first flexor column from the three flexor columns, a reader module is bonded to a second flexor column from the three flexor columns, and a second writer module is bonded to a third flexor column from the three flexor columns. A technical advantage of the apparatus includes an elimination of wide writers, where the wide writers retain the reader in the shadow of the writer during skew (tape dimensional stability) motion. The apparatus provides technical advantages that include additional track following degrees of freedom, skew (tape dimensional stability) degrees of freedom, and reader/writer alignment degrees of freedom to accommodate the misalignment caused by (tape dimensional stability) skew correction.

In embodiments, the apparatus further includes a top portion of each of the three flexor columns is connected to the top section of the spring actuator and a bottom portion of each of the three flexor columns is connect to the bottom section of the spring actuator.

In embodiments, the apparatus further includes a first bend in a top portion of each of the three flexor columns and a second bend in a bottom portion of each of the three flexor columns, where the first bend and the second bend form the C-shape for the spring actuator.

In embodiments, the apparatus further includes a first bend in a top portion of each of the three flexor columns and a second bend in a bottom portion of each of the three flexor columns, where the first bend and the second bend form the C-shape for the spring actuator. The apparatus further includes the top section of the spring actuator includes two top wings each leading to a respective top flexor separated by a top gap and the bottom section of the spring actuator includes two bottom wings each leading to a respective bottom flexor separated by a bottom gap.

In embodiments, the apparatus further includes a first bend in a top portion of each of the three flexor columns and a second bend in a bottom portion of each of the three flexor columns, where the first bend and the second bend form the C-shape for the spring actuator. The apparatus further includes the top section of the spring actuator includes two top wings each leading to a respective top flexor separated by a top gap and the bottom section of the spring actuator includes two bottom wings each leading to a respective bottom flexor separated by a bottom gap. The apparatus further includes two top stiffener wings positioned on opposing sides of the top section of the spring actuator, where each of the two top stiffener wings is bendable in an upward position or a downward position relative to a planar surface of the top section of the spring actuator.

In embodiments, the apparatus further includes a first bend in a top portion of each of the three flexor columns and a second bend in a bottom portion of each of the three flexor columns, where the first bend and the second bend form the C-shape for the spring actuator. The apparatus further includes the top section of the spring actuator includes two top wings each leading to a respective top flexor separated by a top gap and the bottom section of the spring actuator includes two bottom wings each leading to a respective bottom flexor separated by a bottom gap. The apparatus further includes two top stiffener wings positioned on opposing sides of the top section of the spring actuator, where each of the two top stiffener wings is bendable in an upward position or a downward position relative to a planar surface of the top section of the spring actuator. The apparatus further includes two bottom stiffener wings positioned on opposing sides of the bottom section of the spring actuator, where each of the two bottom stiffener wings is bendable in an upward position or a downward position relative to a planar surface of the bottom section of the spring actuator.

In embodiments, the apparatus where the first flexor column is in parallel with the second flexor column and the second flexor column is in parallel with the third flexor column.

In embodiments, the apparatus where the first flexor column is in parallel with the second flexor column and the second flexor column is in parallel with the third flexor column. The apparatus further includes a first gap present between the first flexor column and the second flexor column and a second gap present between the second flexor column and the third flexor column.

In embodiments, the apparatus where the first flexor column is in parallel with the second flexor column and the second flexor column is in parallel with the third flexor column. The apparatus further includes a first gap present between the first flexor column and the second flexor column and a second gap present between the second flexor column and the third flexor column. The apparatus further includes a first module gap between the first writer module and the reader module and a second module gap between the reader module and the second writer module.

In embodiments, the apparatus where the first flexor column is in parallel with the second flexor column and the second flexor column is in parallel with the third flexor column. The apparatus further includes a first gap present between the first flexor column and the second flexor column and a second gap present between the second flexor column and the third flexor column. The apparatus further includes a first module gap between the first writer module and the reader module and a second module gap between the reader module and the second writer module. The apparatus further includes a first cable coupled to the first writer module, a second cable coupled to the reader module, and a third cable coupled to the second writer module.

In embodiments, the apparatus where the first flexor column is in parallel with the second flexor column and the second flexor column is in parallel with the third flexor column. The apparatus further includes a first gap present between the first flexor column and the second flexor column and a second gap present between the second flexor column and the third flexor column. The apparatus further includes a first module gap between the first writer module and the reader module and a second module gap between the reader module and the second writer module. The apparatus further includes a first cable coupled to the first writer module, a second cable coupled to the reader module, and a third cable coupled to the second writer module. The apparatus where the first cable and the second cable are routed through the first gap, and the third cable is routed through the second gap.

In embodiments, the apparatus where the first flexor column is in parallel with the second flexor column and the second flexor column is in parallel with the third flexor column. The apparatus further includes a first gap present between the first flexor column and the second flexor column and a second gap present between the second flexor column and the third flexor column. The apparatus further includes a first module gap between the first writer module and the reader module and a second module gap between the reader module and the second writer module. The apparatus further includes a first cable coupled to the first writer module, a second cable coupled to the reader module, and a third cable coupled to the second writer module. The apparatus where the first cable and the second cable are routed through the first gap, and the third cable is routed through the second gap. The apparatus where the first cable and the second cable do not contact one another.

In embodiments, the apparatus where the first flexor column is in parallel with the second flexor column and the second flexor column is in parallel with the third flexor column. The apparatus further includes a first gap present between the first flexor column and the second flexor column and a second gap present between the second flexor column and the third flexor column. The apparatus further includes a first module gap between the first writer module and the reader module and a second module gap between the reader module and the second writer module. The apparatus further includes a first cable coupled to the first writer module, a second cable coupled to the reader module, and a third cable coupled to the second writer module. The apparatus where the first cable is routed through the first gap, and the second cable and the third cable are routed through the second gap.

In embodiments, the apparatus where the first flexor column is in parallel with the second flexor column and the second flexor column is in parallel with the third flexor column. The apparatus further includes a first gap present between the first flexor column and the second flexor column and a second gap present between the second flexor column and the third flexor column. The apparatus further includes a first module gap between the first writer module and the reader module and a second module gap between the reader module and the second writer module. The apparatus further includes a first cable coupled to the first writer module, a second cable coupled to the reader module, and a third cable coupled to the second writer module. The apparatus where the first cable is routed through the first gap, and the second cable and the third cable are routed through the second gap. The apparatus where the second cable and the third cable do not contact one another.

In embodiments, the apparatus where the first writer module is bonded to the first flexor column at a first angle that is greater or less than zero relative to a planar surface of the second flexor column to which the reader module is bonded.

In embodiments, the apparatus where the second writer module is bonded to the first flexor column at a second angle that is greater than or less than zero relative to a planar surface of the second flexor column to which the reader module is bonded.

In embodiments, the apparatus where the first writer module is bonded to the first flexor column at a first angle that is greater or less than zero relative to a planar surface of the second flexor column to which the reader module is bonded and the second writer module is bonded to the first flexor column at a second angle that is greater than or less than zero relative to a planar surface of the second flexor column to which the reader module is bonded.

In embodiments, the apparatus where the first writer module is bonded to the first flexor column at a first angle that is greater or less than zero relative to a planar surface of the second flexor column to which the reader module is bonded and the second writer module is bonded to the first flexor column at a second angle that is greater than or less than zero relative to a planar surface of the second flexor column to which the reader module is bonded. The apparatus where the first angle is not equal to the second angle.

In embodiments, the apparatus further includes a top voice coil positioned above the reader module and a bottom voice coil positioned below the first writer module and the second writer module.

In embodiments, the apparatus further includes a top voice coil positioned above the reader module and a bottom voice coil positioned below the first writer module and the second writer module. The apparatus where the top voice coil includes a top base leading to a top structure and the top structure is bonded to the reader module in an upper area.

In embodiments, the apparatus further includes a top voice coil positioned above the reader module and a bottom voice coil positioned below the first writer module and the second writer module. The apparatus where the top voice coil includes a top base leading to a top structure and the top structure is bonded to the reader module in an upper area. The apparatus where the bottom voice coil includes a bottom base leading to a left structure and a right structure, the left structure is bonded to the first writer module in a lower area, and the right structure is bonded to the second writer module in the lower area.

In embodiments, the apparatus further includes a top bender piezo actuator of a top section of the spring actuator configured to actuate the reader module bonded to the second flexor column and a bottom bender piezo actuator of a bottom section of the spring actuator configured to actuate the first writer module bonded to the first flexor column and the second writer module bonded to the third flexor column.

In embodiments, the apparatus further includes a top bender piezo actuator of a top section of the spring actuator configured to actuate the reader module bonded to the second flexor column and a bottom bender piezo actuator of a bottom section of the spring actuator configured to actuate the first writer module bonded to the first flexor column and the second writer module bonded to the third flexor column. The apparatus further includes a first member of the top bender piezo actuator connected to the first flexor column with the first writer module and a second member of the top bender piezo actuator connector to the third flexor column with the second writer module, where the first member and the second member are of a non-active piezo material.

In embodiments, the apparatus further includes a top bender piezo actuator of a top section of the spring actuator configured to actuate the reader module bonded to the second flexor column and a bottom bender piezo actuator of a bottom section of the spring actuator configured to actuate the first writer module bonded to the first flexor column and the second writer module bonded to the third flexor column. The apparatus further includes a first member of the top bender piezo actuator connected to the first flexor column with the first writer module and a second member of the top bender piezo actuator connector to the third flexor column with the second writer module, where the first member and the second member are of a non-active piezo material. The apparatus further includes a third member of the bottom bender piezo actuator connector to the second flexor column with the reader module, where the third member is of a non-active piezo material.

In embodiments, the apparatus where the spring actuator is secured by clamps on a coarse motion elevator positioned between a first roller and a second roller in a tape drive.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

Moreover, although various reference numerals may be used across different drawings, the same or similar reference numbers are used throughout the drawings to denote the same or similar features, elements, or structures, and thus detailed explanations of the same or similar features, elements, or structures may not be repeated for each of the drawings for economy of description. Labeling for the same or similar elements in some drawings may be omitted as well in order not to overcrowd the drawings.

Embodiments of the present invention provide an apparatus to eliminate wide writers. Wide writers retain the reader in trailing path of the writer during tape dimensional stability (TDS) corrective skew motion which introduces multiple issues. The multiples issues can include capacity loss due to a large un-shingled track, low quality edge writing due to a lower signal, limitation on TDS corrective range during write operations, and limitation for implementation of perpendicular recording. Embodiments of the present invention recognize the need for an extra degree of freedom to accommodate the misalignment caused by TDS skew correction and provide a spring actuator module assembly that provides track following degree of freedom, TDS skew degree of freedom, and reader/writer alignment degree of freedom. Each of the reader and the writer modules are independent from one another and each of the reader and the writer modules are bonded to and suspended from the flexor columns of the spring actuator.

FIG. 1 depicts a three-dimensional view of a spring actuator with three flexor columns, in accordance with an embodiment of the present invention. Spring actuator 100 includes top section 102, middle section 104, and bottom section 106, where spring actuator 100 is folded into a C-shape and includes a pre-established lateral offset between top section 102 and bottom section 106. Top section 102 is bent at a 90-degree angle relative to middle section 104 and bottom section 106 is bent at a 90-degree relative to middle section 104, forming the C-shape of spring actuator 100. Top section 102 includes two top wings 108 each leading to a respective top flexor separated by top gap 109 for placement and securing to a fixture, not illustrated in FIG. 1. The top flexor represents the two structural members leading from a solid area of top section 102 to the two top wings 108. In some embodiments, two top wings 108 of top section 102 include one or more apertures (not illustrated in FIG. 1) for securing spring actuator 100. Similar to top section 102, bottom section 106 includes two bottom wings 110 each leading to a respective bottom flexor separated by bottom gap 111 for placement and securing to the fixture, not illustrated in FIG. 1. The bottom flexor represents the two structural members leading from a solid area of bottom section 106 to the two bottom wings 110. In some embodiments, two bottom wings 110 of bottom section 106 includes one or more apertures (not illustrated in FIG. 1) for securing spring actuator 100. The top flexors and the bottom flexors of top section 102 and bottom section 106, respectively, are configured to bend (e.g., ±500 μm) when performing track following.

Top section 102 of spring actuator 100 includes two top stiffener wings 112 positioned on opposing sides, where each of the two top stiffener wings 112 provides additional rigidity to top section 102. In the illustrated embodiment, two top stiffener wings 112 are bent downward relative to a planar surface of top section 102. In other embodiments, two top stiffener wings 112 are bent upward relative to a planar surface of top section 102. Each of two top stiffener wings 112 is bendable in an upward position (e.g., 90 degrees) or a downward position (e.g., −90 degrees) relative to the planar surface of top section 102, where an angle of each of two top stiffener wings 112 can vary (e.g., 0<x≤90 degrees) depending on an application of spring actuator 100.

Bottom section 106 of spring actuator 100 includes two bottom stiffener wings 114 positioned on opposing sides, where each of the two bottom stiffener wings 114 provides additional rigidity to bottom section 106. In this embodiment, two bottom stiffener wings 114 are bent upward relative to a planar surface of bottom section 106. In other embodiments, two bottom stiffener wings 114 are bent downward relative to a planar surface of bottom section 106. Each of two bottom stiffener wings 114 is bendable in an upward position (e.g., 90 degrees) or a downward position (e.g., −90 degrees) relative to the planar surface of bottom section 106, where an angle of each of two bottom stiffener wings 114 can vary (e.g., 0<x≤90 degrees) depending on an application of spring actuator 100.

Middle section 104 of spring actuator 100 includes flexor columns 116A, 116B, and 116C, where a top portion of each flexor column 116A, 116B, and 116C is connected to top section 102 and a bottom portion of each flexor columns 116A, 116B, and 116C is connected to bottom section 106. The top portion of each flexor column 116A, 116B, and 116C includes a first bend at an angle (e.g., 90 degrees) in top region 118 between top section 102 and middle section 104. The bottom portion of each flexor column 116A, 116B, and 116C includes a second bend at an angle (e.g., 90 degrees) in bottom region 120 between bottom section 106 and middle section 104, where the first bend and the second bend form the C-shape of spring actuator 100.

In this embodiment, flexor columns 116A, 116B, and 116C are parallel to one another, where gap 122A (i.e., first gap) is present between flexor columns 116A and 116B, and gap 122B (i.e., second gap) is present between flexor columns 116B and 116C. Therefore, flexor column 116A is parallel with flexor column 116B and flexor column 116B is in parallel with flexor column 116C. Depending on the application, one or more of flexor columns 116A, 116B, and 116C can be in parallel with one another. For example, in one embodiment, flexor column 116A is parallel with flexor column 116C, where flexor column 116B is positioned nonparallel to flexor columns 116A and 116C. Each of flexor columns 116A, 116B, and 116C provide the structural support for suspending a left writer module, a central reader module, and a right writer module, discussed in further detail with regards to FIGS. 5 and 6. Flexor columns 116A, 116B, and 116C of spring actuator 100 are configured to flex and provide the alignment correction (e.g., ±100 μm). It is to be noted that flexor column 116A corresponds to a first flexor column from the three flexor columns, flexor column 116B corresponds to a second flexor column from the three flexor columns, and flexor column 116C corresponds to a third flexor column from the three flexor columns.

Figure 2:
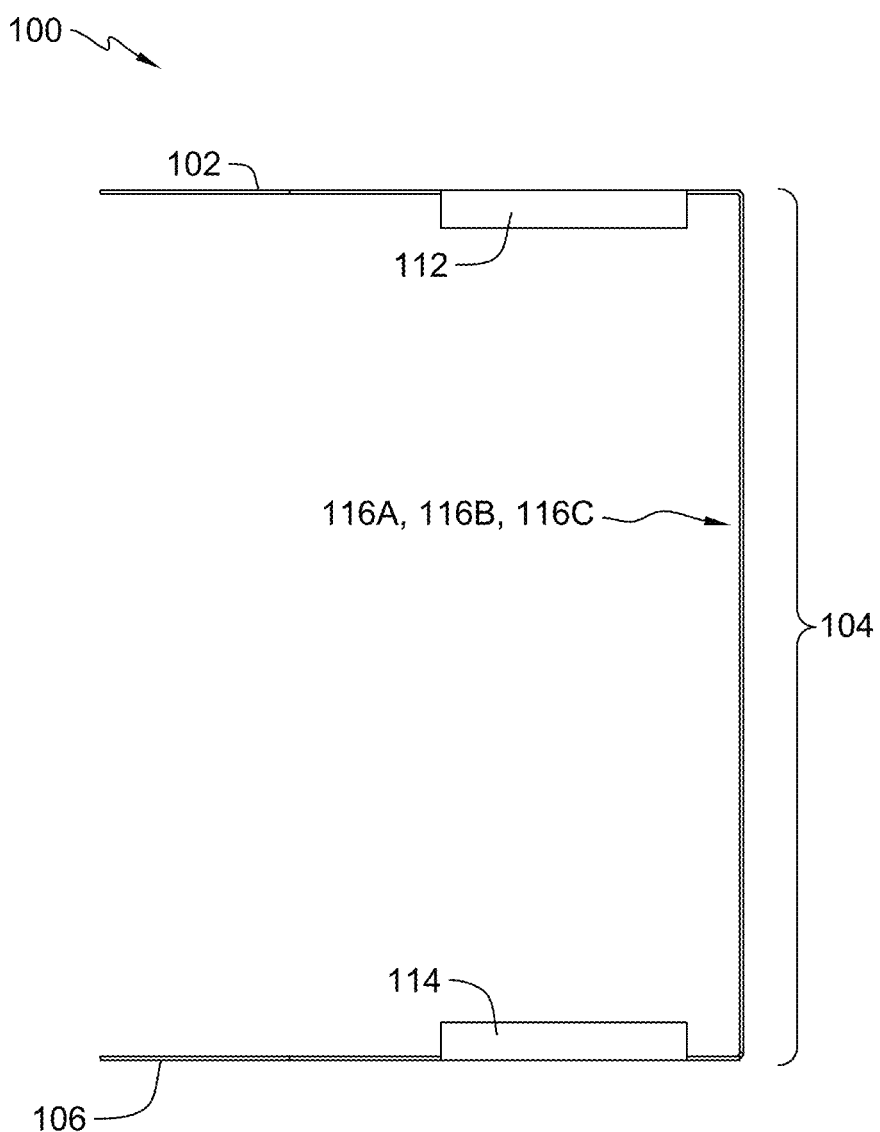
FIG. 2 depicts a side view of a spring actuator with three flexor columns, in accordance with an embodiment of the present invention.

FIG. 2 depicts a side view of the spring actuator 100 with three flexor columns, in accordance with an embodiment of the present invention. Top section 102 of spring actuator 100 includes folded two top stiffener wings 112, where each of two top stiffener wings 112 is folded in a downward position (e.g., 50 degrees) relative to the planar surface of top section 102. The downward position of two top stiffener wings 112 can also be referred to as an inward position relative to the C-shape of spring actuator 100. Bottom section 106 of spring actuator 100 includes folded two bottom stiffener wings 114, where each of two bottom stiffener wings 114 is folded in an upward position (e.g., 50 degrees) relative to the planar surface of bottom section 106. The upward position of two bottom stiffener wings 114 can also be referred to as an inward position relative to the C-shape of spring actuator 100. Though in this embodiment, middle section 104 of spring actuator 100 does not include any middle stiffener wings, in some embodiments middle stiffener wings can be integrated into one or more of flexor columns 116A, 116B, and 116C. Similar to two top stiffener wings 112 and two bottom stiffener wings 114, the middle stiffener wings of the one or more of flexor columns 116A, 116B, and 116C can be folded inward or outward relative to the C-shape of spring actuator 100.

Figure 3:
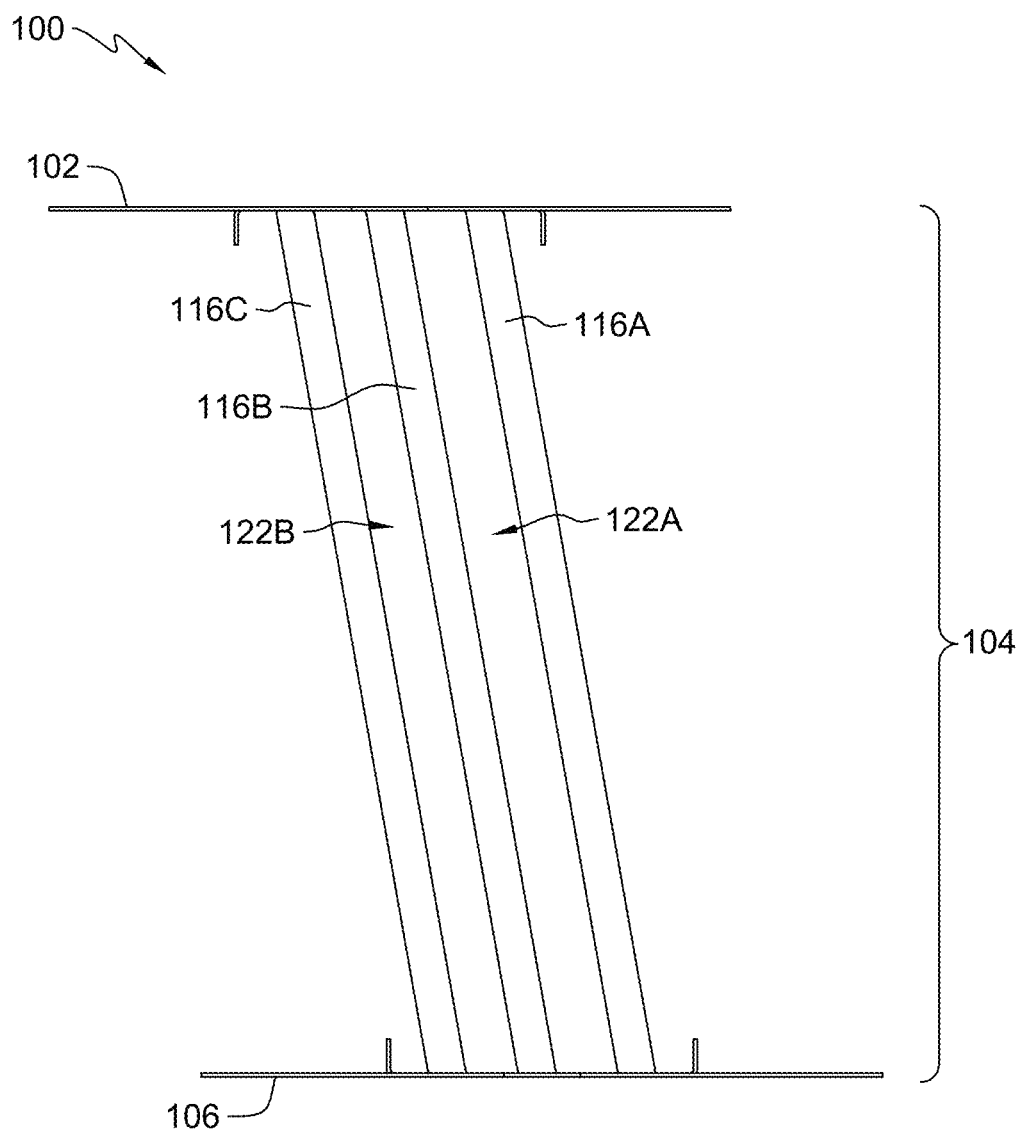
FIG. 3 depicts a rear view of a spring actuator with three flexor columns, in accordance with an embodiment of the present invention.

FIG. 3 depicts a rear view of the spring actuator 100 with three flexor columns, in accordance with an embodiment of the present invention. In this rear view of spring actuator 100, gap 122A between flexor column 116A and 116B and gap 122B between flexor column 116B and 116C of middle section 104 is visible. In this embodiment, gap 122A and 122B are the same width, creating a similar spacing between flexor columns 116A, 116B, and 116C. In other embodiments, gap 122A and 122B are not the same width, where a first space between flexor columns 116A and 116B is different than a second space between flexor columns 116B and 116C. As previously discussed, a pre-established lateral offset is present between top section 102 and bottom section 106 of spring actuator 100, where each of flexor columns 116A, 116B, and 116C are skewed based on the pre-established offset angle (e.g., 10 degrees) resulting the pre-established lateral offset between top section 102 and bottom section 106. Said differently, the top section 102 is laterally offset from the bottom section such that an angle of the flexor columns 116A, 116B, and 116C relative to each of the top section 102 and the bottom section 106 is approximately 10 degrees, as illustrated in FIG. 3. The pre-established offset angle allows for additional skew (tape dimensional stability) degrees of freedom of spring actuator 100. Since each of flexor columns 116A, 116B, and 116C provide the structural support for suspending a left writer module, a central reader module, and a right writer module (discussed in further detail with regards to FIGS. 5 and 6), each of the left writer module, the central reader module, and the right writer module are also skewed based on the pre-established offset.

Figure 4:
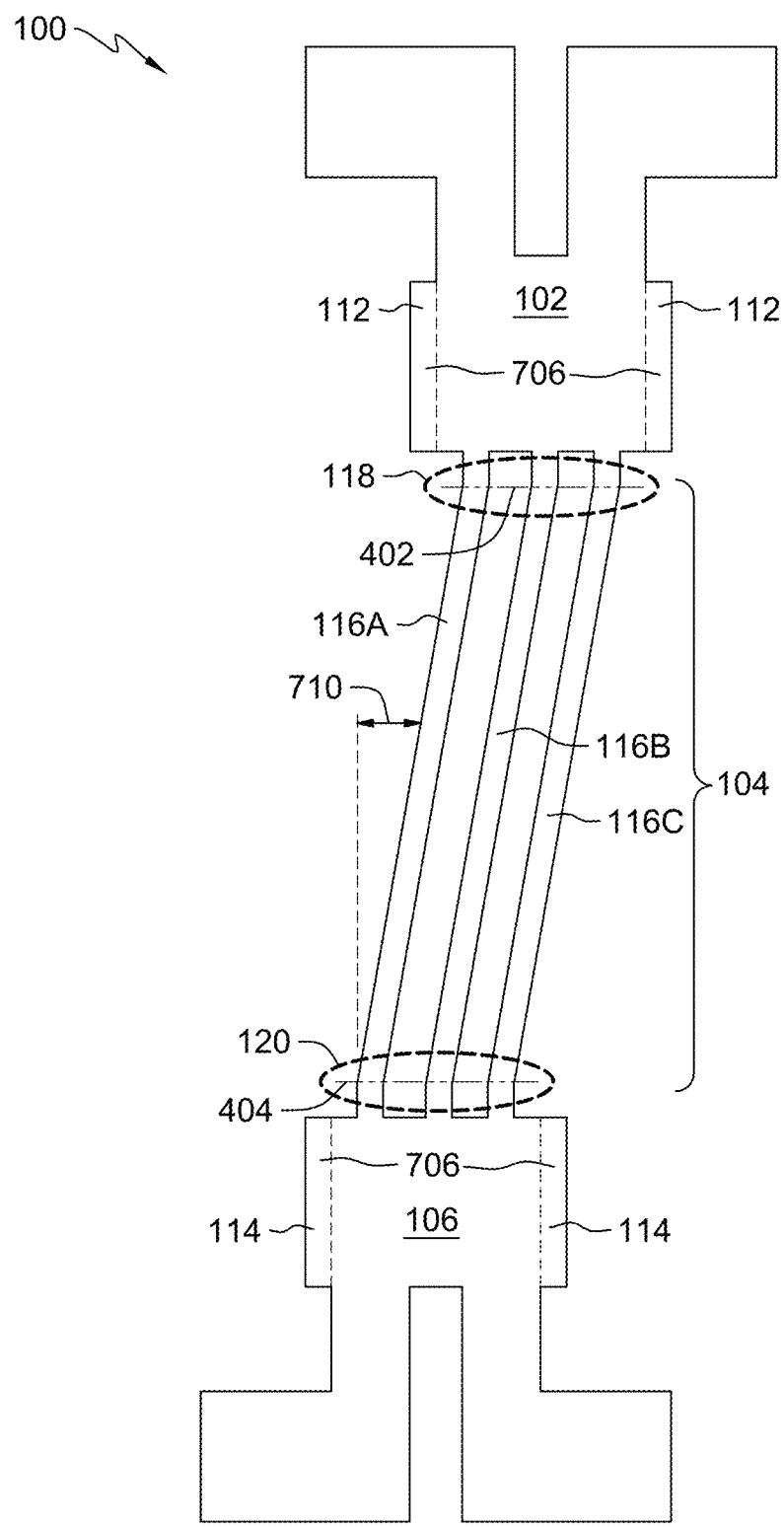
FIG. 4 depicts a top view of a spring actuator with three flexor columns prior to folding, in accordance with an embodiment of the present invention.

FIG. 4 depicts a top view of the spring actuator 100 with three flexor columns prior to folding, in accordance with an embodiment of the present invention. Spring actuator 100 is fabricated by cutting (e.g., water, laser) a sheet of material (e.g., spring steel) and bending into a C-shape along first bend line 402 in top region 118 and second bend line 404 in bottom region 120. First bend line 402 separates top section 102 from middle section 104 for reference purposes and second bend line 404 separates middle section 104 from bottom section 106 for reference purposes. For two top stiffener wings 112 and two bottom stiffener wings 114 (also referred to as stiffener wing set 706), during the manufacturing process indentations can be introduced into the material to allow for easier bending along bend lines for two top stiffener wings 112 and two bottom stiffener wings 114. In this embodiment, pre-determined offset 710 for flexor columns 116A, 116B, and 116C is approximately 10 degrees. It is to be noted that pre-determined offset 710 can be any value based on the application needs of spring actuator 100. Additionally, the pre-determined offset is determined by the arrangement of the various sections in the flat pattern. Said differently, adjustments to the flat pattern will be required to effectively adjust the pre-determined offset 710.

Figure 5:
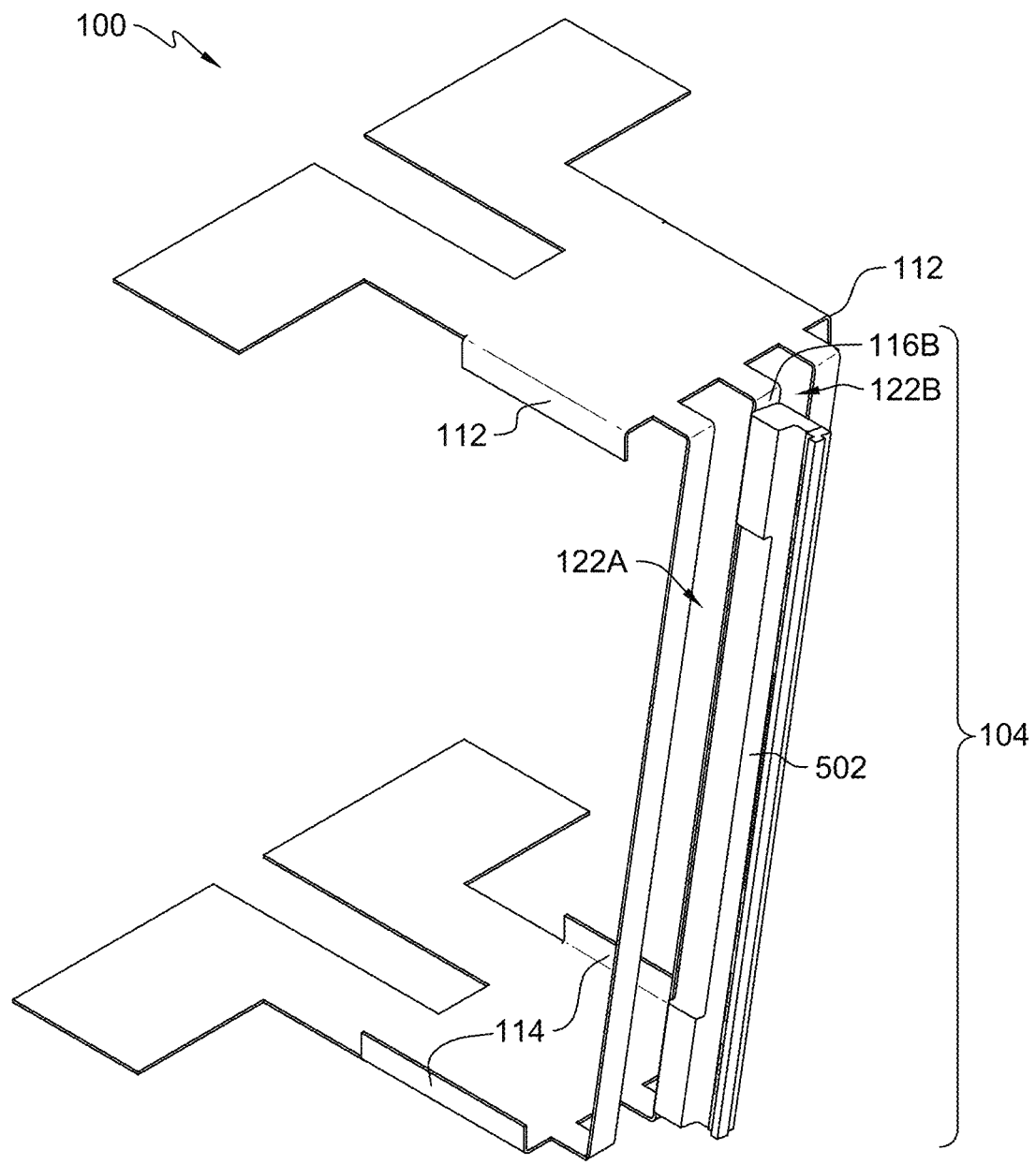
FIG. 5 depicts a three-dimensional view of a spring actuator with three flexor columns with a central reader module, in accordance with an embodiment of the present invention.

FIG. 5 depicts a three-dimensional view of the spring actuator 100 with three flexor columns with a central reader module 502, in accordance with an embodiment of the present invention. Spring actuator 100 is manufactured previously shown in FIG. 4 and bent into the C-shape structure with folded two top stiffener wings 112 and two bottom stiffener wings 114 as illustrated in FIG. 5. Central reader module 502 is bonded to flexor column 116B in middle section 104 of spring actuator 100. It is noted that a cable (not illustrated in FIG. 5) would be coupled to central reader module 502 which can be routed through gap 122A or gap 122B prior to central reader module 502 being bonded to flexor column 116B. Central reader module 502 is bonded to flexor column 116B with a looser positional tolerance, since a position of the left writer module and a position of the right writer module would be relative to the position of the central reader module 502 bonded to flexor column 116B. The positions of the left writer module and the right writer module would have a tighter positional tolerance compared to central reader module 502.

Figure 6:
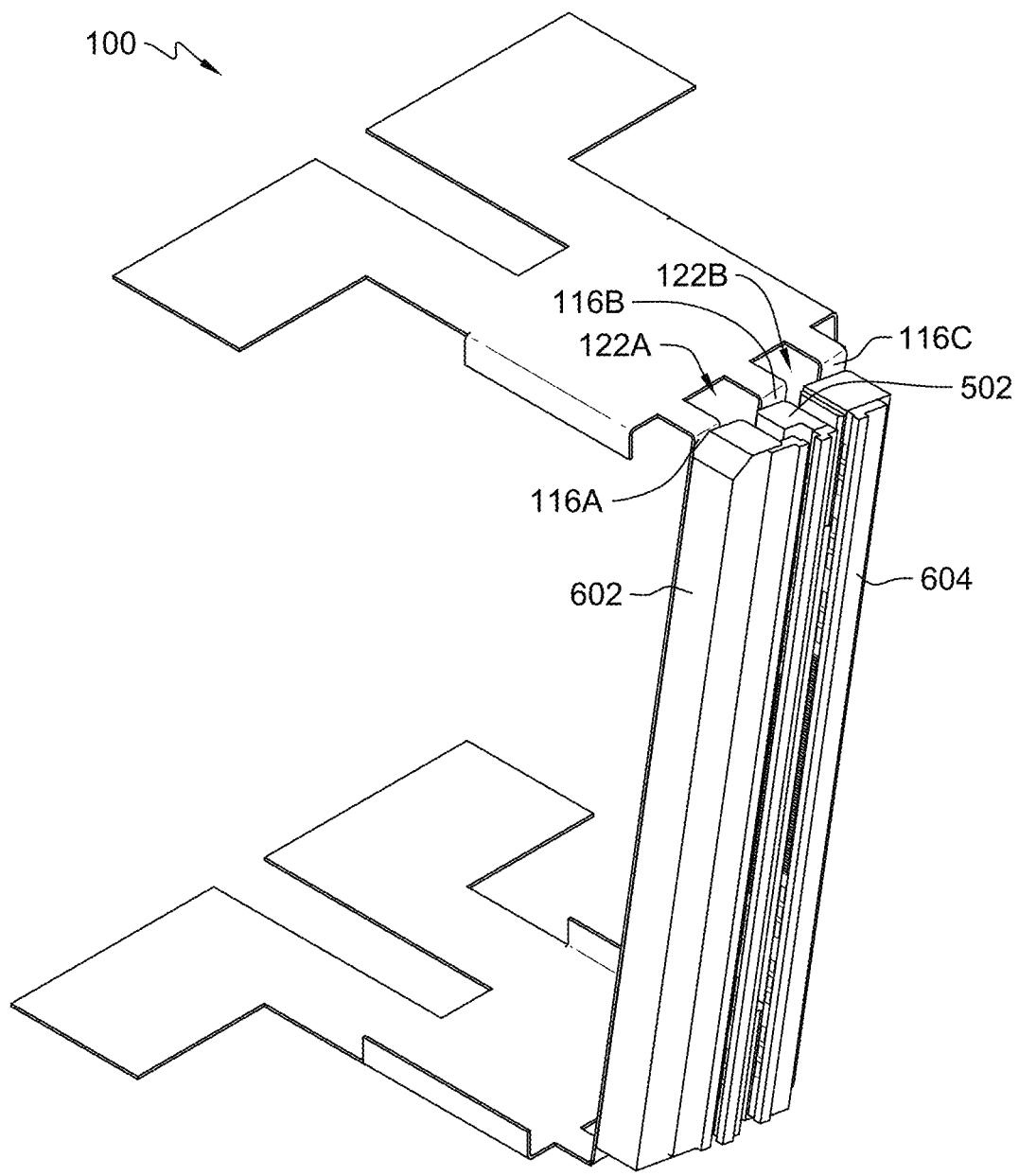
FIG. 6 depicts a three-dimensional view of a spring actuator with three flexor columns with a central reader module, a right writer module, and a left writer module, in accordance with an embodiment of the present invention.

FIG. 6 depicts a three-dimensional view of the spring actuator 100 with three flexor columns with a central reader module, a right writer module, and a left writer module, in accordance with an embodiment of the present invention. Left writer module 602 is bonded to flexor column 116A and right writer module 604 is bonded to flexor column 116C in middle section 104 of spring actuator 100. It is to be noted that central reader module 502 corresponds to a reader module, left writer module 602 corresponds to first writer module, and right writer module 604 corresponds to second writer module.

Similar to central reader module 502, it is to be noted that a respective cable (not illustrated in FIG. 6) would be coupled to left writer module 602 and right writer module 604. The cable from left writer module 602 can be routed through gap 122A between flexor columns 116A and 116B or in an area exterior to flexor column 116A. If the cable from left writer module 602 is routed through gap 122A and the cable from central reader module 502 is also routed through gap 122A, both cables from left writer module 602 and central reader module 502 would have to be routed through gap 122A while avoiding contact with one another. The cable from right writer module 604 can be routed through gap 122B between flexor columns 116B and 116C or in an area exterior to flexor column 116C. If the cable from right writer module 604 is routed through gap 122B and the cable from central reader module 502 is also routed through gap 122B, both cables from right writer module 604 and central reader module 502 would have to be routed through gap 122B while avoiding contact with one another. The cable routing for central reader module 502, left writer module 602, and right writer module 604 is discussed in further detail with regards to FIG. 9.

Figure 7:
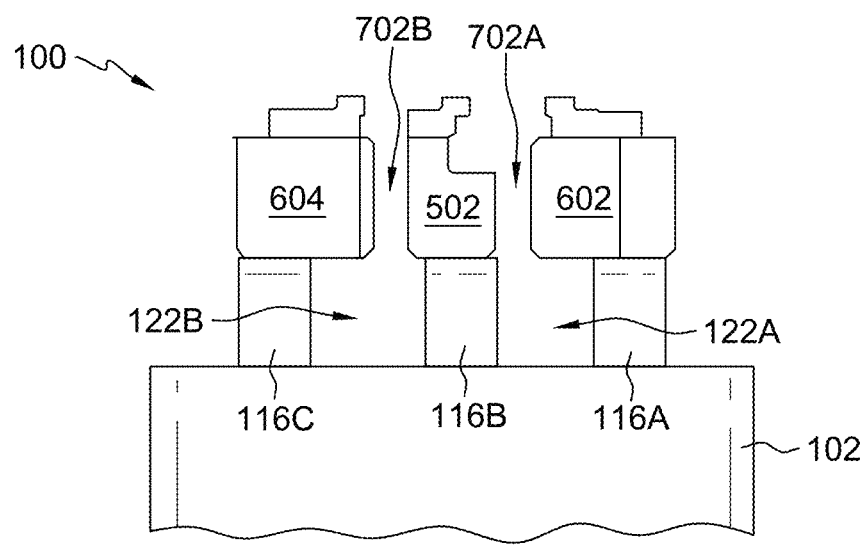
FIG. 7 depicts an enhanced top view of a spring actuator with three flexor columns with a central reader module, a right writer module, and a left writer module, in accordance with an embodiment of the present invention.

FIG. 7 depicts an enhanced top view of a spring actuator with three flexor columns with a reader module, a right writer module, and a left writer module, in accordance with an embodiment of the present invention. In this simplified enhanced top view of spring actuator 100, top section 102 with flexor columns 116A, 116B, and 116C are shown. Though central reader module 502, left writer module 602, and right writer module 604 appear to share a similar planar mounting surface on flexor columns 116A, 116B, and 116C, left writer module 602 and right writer module 604 are both skewed relative to a planar mounting surface of central reader module 502. An exaggerated position of central reader module 502, left writer module 602, and right writer module 604 is discussed below with regards to FIG. 8. Left writer module 602 is bonded to flexor column 116A relative to a position of central reader module 502 bonded to flexor column 116B with module gap 702A (i.e., first module gap) separating left writer module 602 and central reader module 502. Right writer module 604 is bonded to flexor column 116C relative to the position of central reader module 502 bonded to flexor column 116C with module gap 702B (i.e., second module gap) separating right writer module 604 and central reader module 502.

Figure 8:
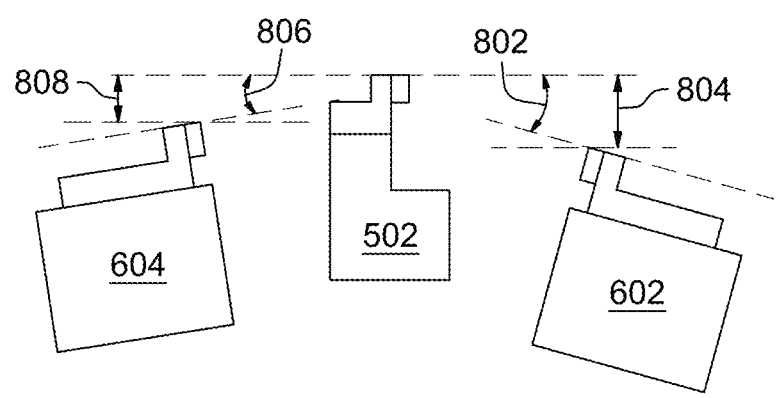
FIG. 8 depicts an enhanced top view of a spring actuator with three flexor columns with an exaggerated positioning of a central reader module, a right writer module, and a left writer module, in accordance with an embodiment of the present invention.

FIG. 8 depicts an enhanced top view of a spring actuator with three flexor columns with an exaggerated positioning of a central reader module, a right writer module, and a left writer module, in accordance with an embodiment of the present invention. Left writer module 602 is bonded to flexor column 116A (not shown in FIG. 8) at left writer angle 802 (i.e., first angle) with left height to height distance 804 relative to central reader module 502. Right writer module 604 is bonded to flexor column 116C (not shown in FIG. 8) at right writer angle 806 (i.e., second angle) with right height to height distance 808 relative to central reader module 502. It is to be noted that the left writer angle 802, left height to height distance 804, right writer angle 806, and right height to height distance 808 are exaggerated for illustrative purposes. Left writer module 602 can be bonded to flexor column 116A at left writer angle 802 that is greater than or less than zero relative to a planar surface of flexor column 116B to which central reader module 502 is bonded. Right writer module 604 can be bonded to flexor column 116C at right writer angle 806 that is greater than or less than zero relative to a planar surface of flexor column 116B to which central reader module 502 is bonded. In this embodiment, left writer angle 802 is not equal to right writer angle 806.

Figure 9:
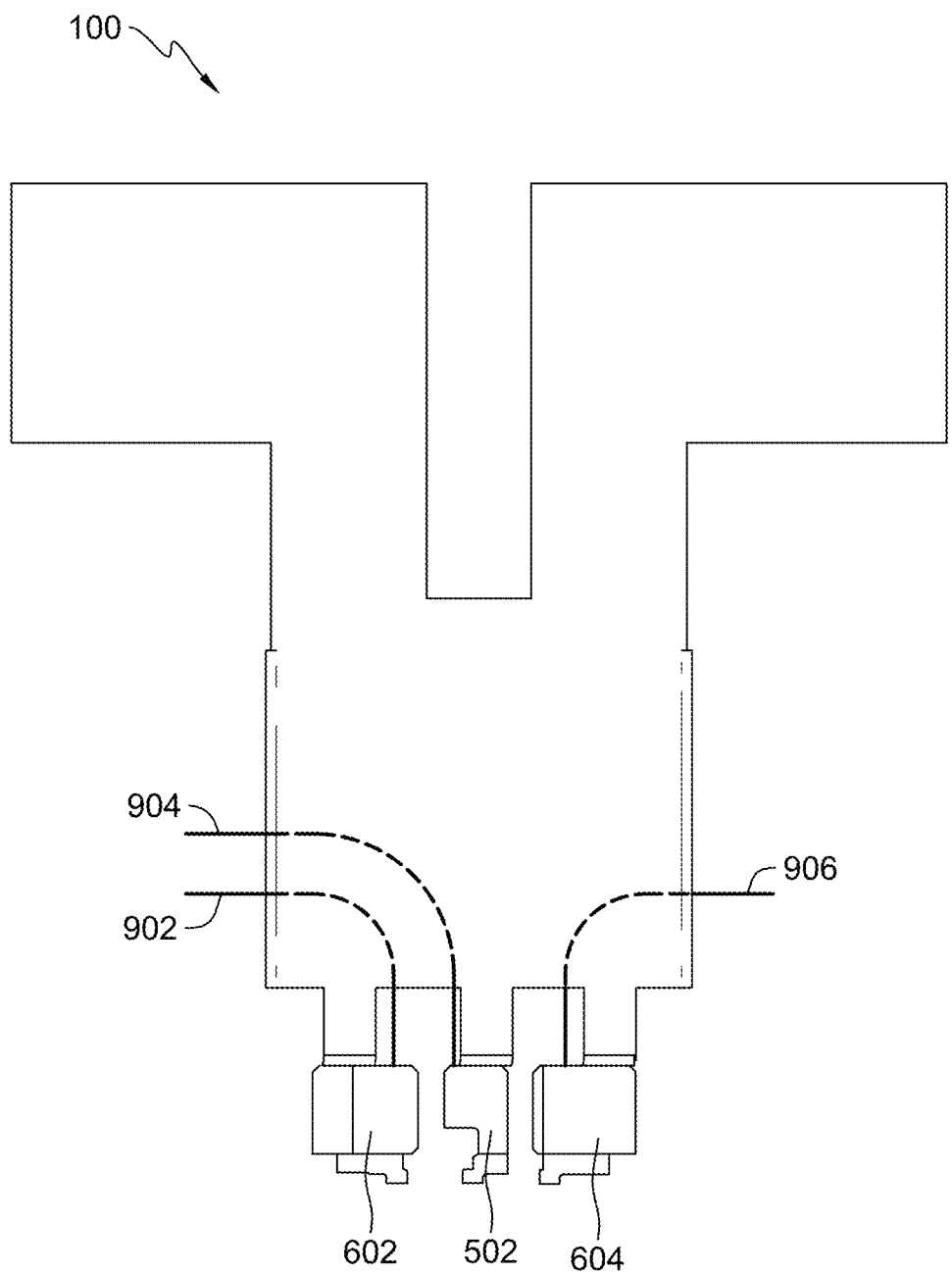
FIG. 9 depicts a top view for cable routing for a central reader module, a right writer module, and a left writer module of a spring actuator, in accordance with an embodiment of the present invention.

FIG. 9 depicts a top view for cable routing for a central reader module, a right writer module, and a left writer module of a spring actuator, in accordance with an embodiment of the present invention. In this embodiment, left cable 902 (i.e., first cable) coupled to left writer module 602 is routed through gap 122A and out a left side of spring actuator 100. Center cable 904 (i.e., second cable) coupled to central reader module 502 is also routed through gap 122A and out a left side of spring actuator 100, where left cable 902 and center cable 904 are routed in a manner where the two cables do not contact one another. Right cable 906 (i.e., third cable) coupled to right writer module 604 is routed through gap 122B and out a right side of spring actuator 100. In other embodiments, center cable 904 coupled to central reader module 502 is routed through gap 122B and out a right side of spring actuator 100, where center cable 904 and right cable 906 are routed in a manner where the two cables do not interfere with the dynamics of the actuator, nor interfere with one another electrically. It is to be noted that avoiding contact between left cable 902, center cable 904, and right cable 906 in an immediate environment (i.e., vicinity) of spring actuator 100 is important because any contact would cause interference in the physical dynamics of spring actuator 100 and interference in the signals that each of the cables carry. Left cable 902, center cable 904, and right cable 906 may eventually touch downstream of spring actuator 100, outside of the immediate environment of spring actuator 100.

Figure 10:
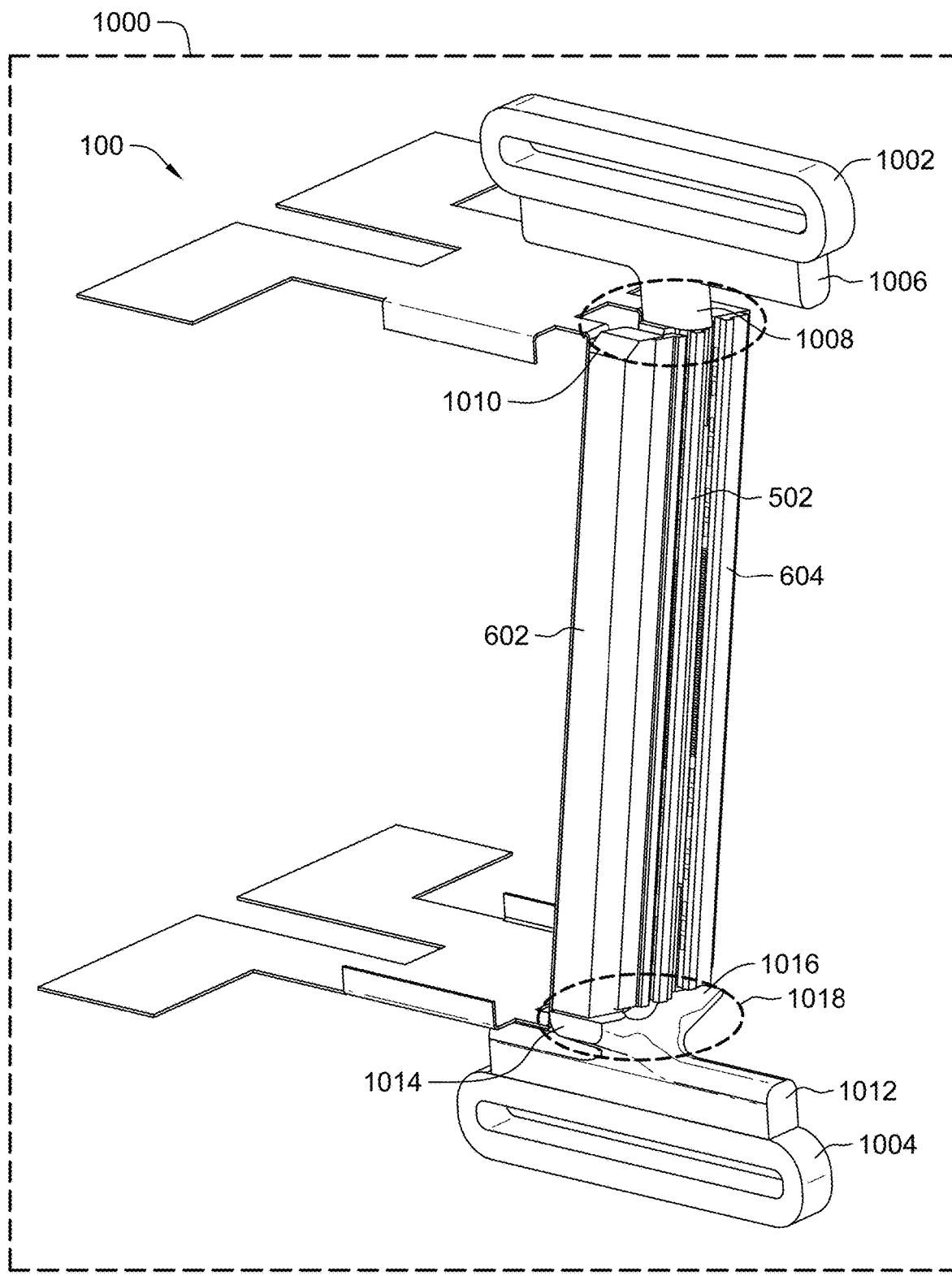
FIG. 10 depicts a three-dimensional view of a spring actuator module assembly with voice coils, in accordance with an embodiment of the present invention.

FIG. 10 depicts a three-dimensional view of a spring actuator module assembly with voice coils, in accordance with an embodiment of the present invention. Spring actuator module assembly 1000 includes spring actuator 100 with bonded central reader module 502, left writer module 602, and right writer module 604, along with top voice coil 1002 positioned above central reader module 502 and bottom voice coil 1004 positioned below left writer module 602 and right writer module 604. Top voice coil 1002 includes top base 1006 that leads to top structure 1008, where top structure 1008 is bonded to central reader module 502 in upper area 1010. Bottom voice coil 1004 include bottom base 1012 that leads to left structure 1014 and right structure 1016. Left structure 1014 is bonded to left writer module 602 in lower area 1018 and right structure 1016 is bonded to right writer module 604. In other embodiments, top voice coil 1002 and/or bottom voice coil 1004 are substituted in the spring actuator module assembly 1000 with a different type of force generating element, such as, a top piezoelectric element and a bottom piezoelectric element.

Figure 11:
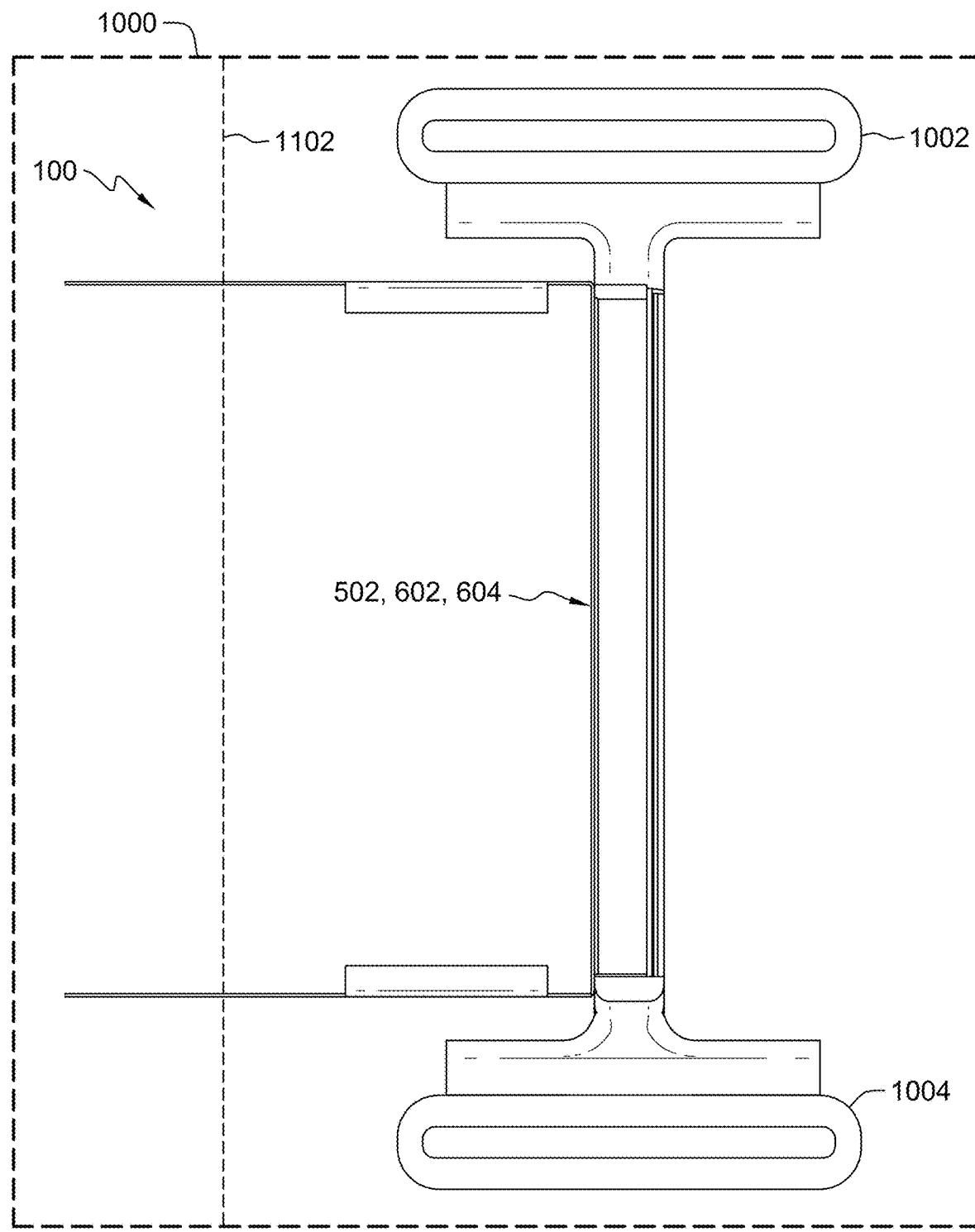
FIG. 11 depicts a side view of a spring actuator module assembly with voice coils, in accordance with an embodiment of the present invention.

FIG. 11 depicts a side view of a spring actuator module assembly with voice coils, in accordance with an embodiment of the present invention. Line 1102 delineates spring actuator module assembly 1000 into two portions, where a first portion of spring actuator 100 of spring actuator module assembly 1000 is mounted into a fixture and a second portion of spring actuator 100 of spring actuator module assembly 1000 remains external to the fixture. While constructing spring actuator module assembly 1000, spring actuator 100 is temporary mounted into an assembly fixture (not illustrated in FIG. 11) prior to bonding central reader module 502, left writer module 602, and right writer module 604. Spring actuator module assembly 1000 remains in the assembly fixture while top voice coil 1002 is bonded to central reader module 502 and while bottom voice coil 1004 is bonded to left writer module 602 and right writer module 604. Subsequent to construction of spring actuator module assembly 1000, the spring actuator module assembly 1000 is removed from the assembly fixture and remounted to another fixture located in a tape drive, as illustrated in FIG. 13.

Figure 12:
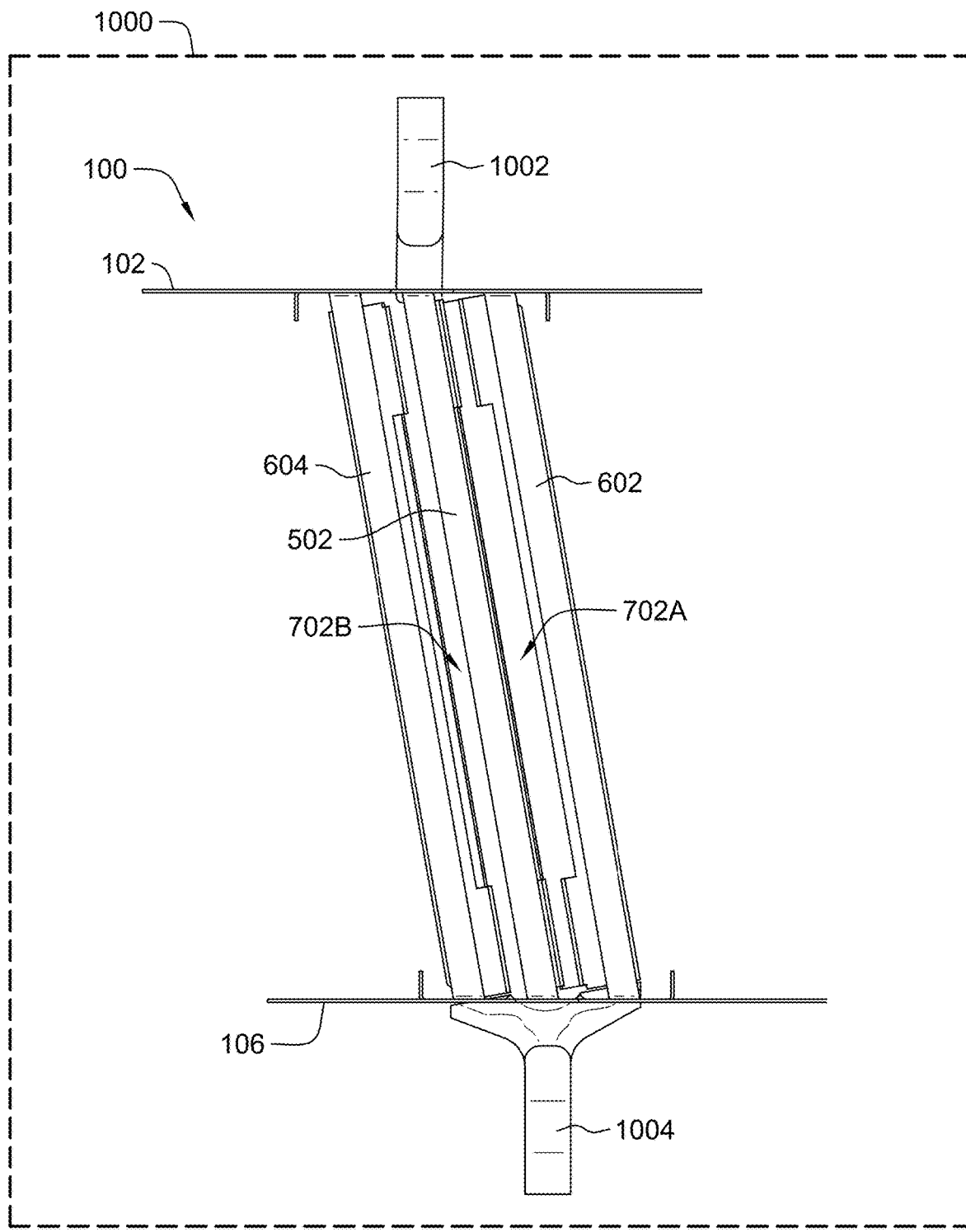
FIG. 12 depicts a rear view of a spring actuator module assembly with voice coils, in accordance with an embodiment of the present invention.

FIG. 12 depicts a rear view of a spring actuator module assembly with voice coils, in accordance with an embodiment of the present invention. In this rear view of spring actuator module assembly 1000, module gap 702A between left writer module 602 and central reader module 502 is visible, and module gap 702B between central reader module 502 and right writer module 604 is visible. As previously discussed, module gap 702A and module gap 702B are respectively established when mounting left writer module 602 and right writer module 604 with respect to central reader module 502. Due to the pre-established offset (e.g., 10 degrees) being present between top section 102 and bottom section 106 of spring actuator 100, top voice coil 1002 is offset with respect to bottom voice coil 1004.

Figure 13:
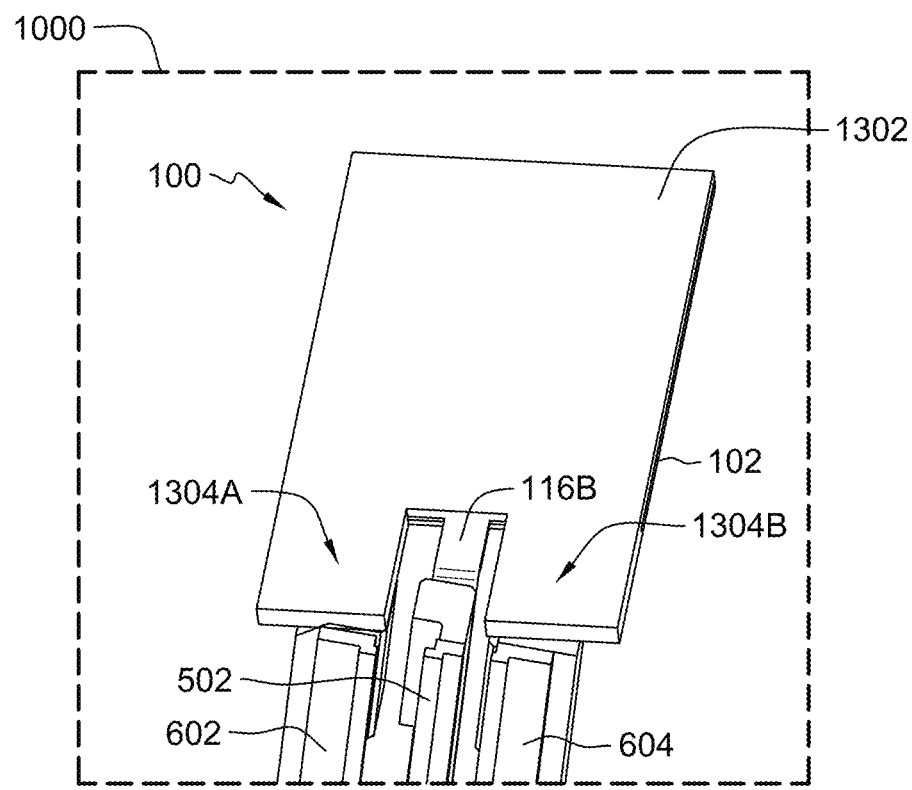
FIG. 13 depicts a top view of a spring actuator module assembly with bender piezo actuators, in accordance with an embodiment of the present invention.

FIG. 13 depicts a top view of a spring actuator module assembly with bender piezo actuators, in accordance with an embodiment of the present invention. Alternative to utilizing voice coils to generate the force and the flexor columns to constrain the module movements, as previously discussed with respect to FIGS. 10-12, spring actuator module assembly 1000 can utilize bender piezo actuators to operate as both the flexor springs and the force generating elements for the flexor columns of spring actuator 100. In this top view, top bender piezo actuator 1302 is bonded to or integrated into top section 102 of spring actuator 100 of spring actuator module assembly 1000. Top bender piezo actuator 1302 includes first member 1304A connected to flexor column 116A (not visible in FIG. 13) with left writer module 602 and second member 1304B connected to flexor column 116C (not visible in FIG. 13) with right writer module 604. First member 1304A and second member 1304B can be of a non-active piezo material and/or can be of a separate beam system that is designed different from the embodiment illustrated in FIG. 13. Top bender piezo actuator 1302 is configured to actuate central reader module 502 bonded to flexor column 116B.

Figure 14:
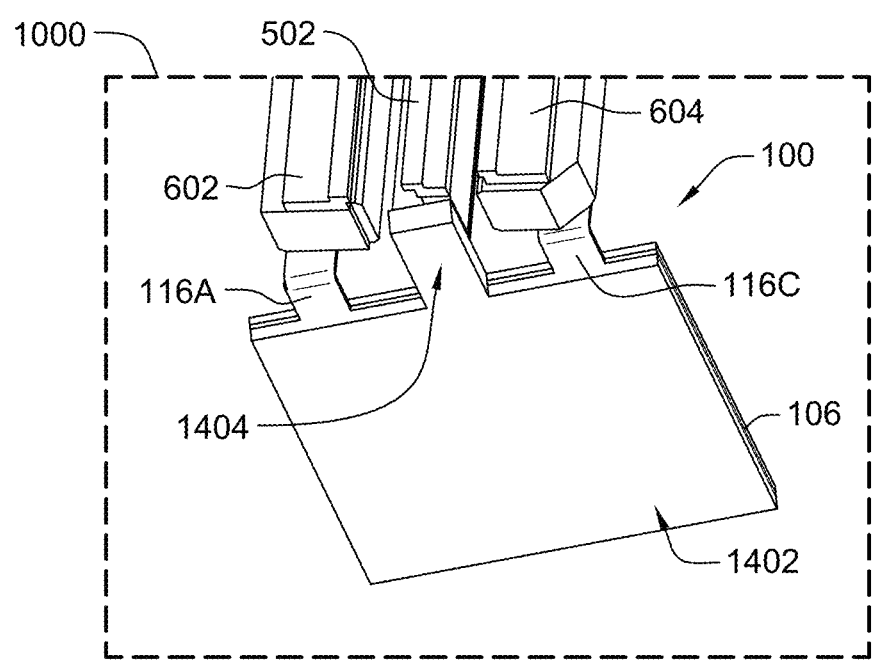
FIG. 14 depicts a bottom view of a spring actuator module assembly with bender piezo actuators, in accordance with an embodiment of the present invention.

FIG. 14 depicts a bottom view of a spring actuator module assembly with bender piezo actuators, in accordance with an embodiment of the present invention. In this bottom view of the embodiment from FIG. 13, bottom bender piezo actuator 1402 is bonded to or integrated into bottom section 106 of spring actuator 100 of spring actuator module assembly 1000. Bottom bender piezo actuator 1402 includes third member 1404 connected to flexor column 116B (not visible in FIG. 14) with central reader module 502. Similar to first member 1304A and second member 1304B, third member 1404 can be of non-active piezo material and/or can be a separate beam system that is designed different from the embodiment illustrated in FIG. 14. Bottom bender piezo actuator 1402 is configured to actuate left writer module 602 bonded to flexor column 116A and right writer module 604 bonded to flexor column 116C.

Figure 15:
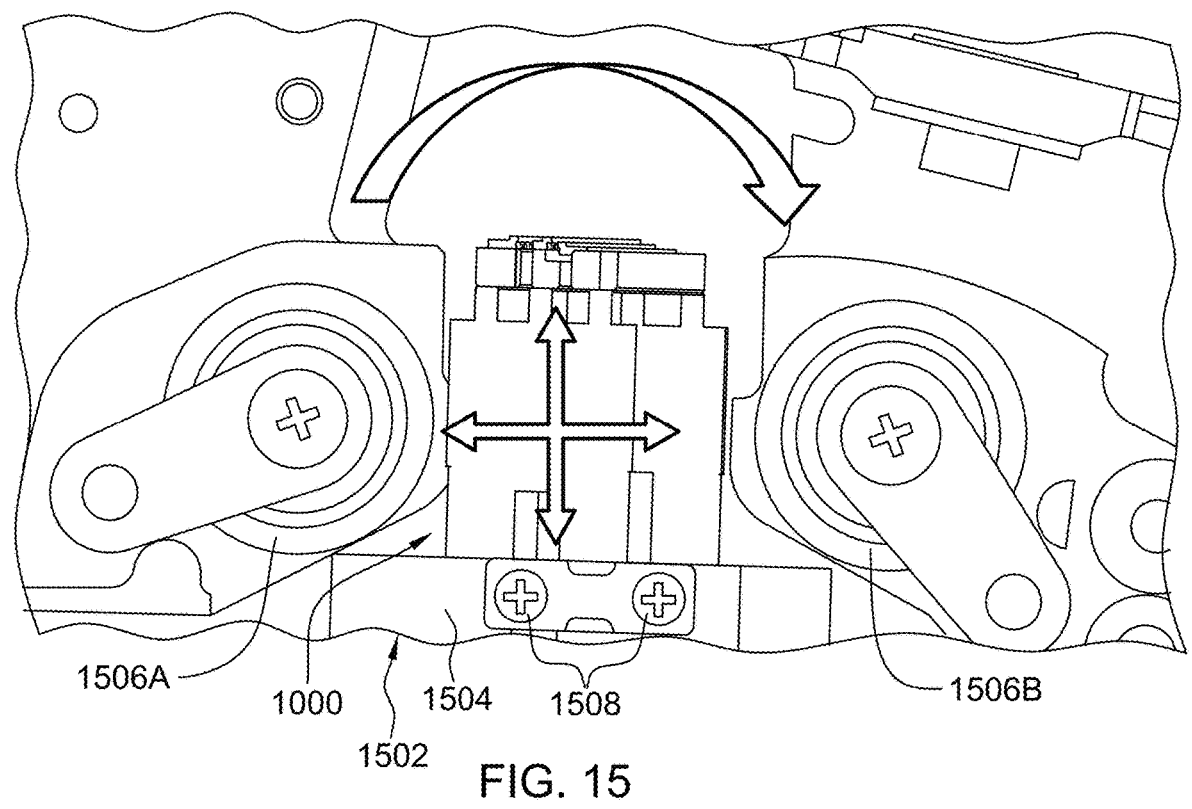
FIG. 15 depicts a top view of a spring actuator module assembly with voice coils mounted in a fixture between two rollers in a tape drive, in accordance with an embodiment of the present invention.

FIG. 15 depicts a top view of a spring actuator module assembly with voice coils mounted in a fixture between two rollers in a tape drive, in accordance with an embodiment of the present invention. In this embodiment, spring actuator module assembly 1000 is secured by clamps on coarse motion elevator 1502, where top clamp 1504 is visible in the top view of spring actuator module assembly 1000. Spring actuator module assembly 1000 is positioned between left roller 1506A (i.e., first roller) and right roller 1506B (i.e., second roller) in a tape drive, where the clamps (e.g., top clamp 1504) allow for adjustment of roll, penetration, and external wrap angle of left writer module 602, central reader module 502, and right writer module 604 of spring actuator module assembly 1000. Once spring actuator module assembly 1000 is correctly positioned between left roller 1506A and right roller 1506B, the clamps are secured with fasteners 1508 to prevent movement of spring actuator module assembly 1000.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of various embodiments of present invention have been presented for the purposes of illustration and they are not intended to be exhaustive and present invention are not limited to the embodiments disclosed. The terminology used herein was chosen to best explain the principles of the embodiments, practical application or technical improvement over technologies found in the marketplace, and to enable others of ordinary skill in the art to understand the embodiments disclosed herein. Many modifications, substitutions, changes, and equivalents will now occur to those of ordinary skill in the art. Such changes, modification, and/or alternative embodiments may be made without departing from the spirit of present invention and are hereby all contemplated and considered within the scope of present invention. It is, therefore, to be understood that the appended claims are intended to cover all such modifications and changes as fall within the spirit of the invention.

What is claimed is:

1. An apparatus comprising:
a top section, a middle section, and a bottom section of a spring actuator form a C-shape of the spring actuator; and
the middle section includes three flexor columns, wherein a first writer module is bonded to a first flexor column from the three flexor columns, a reader module is bonded to a second flexor column from the three flexor columns, and a second writer module is bonded to a third flexor column from the three flexor columns.

2. The apparatus of claim 1, further comprising:
a top portion of each of the three flexor columns is connected to the top section of the spring actuator; and
a bottom portion of each of the three flexor columns is connect to the bottom section of the spring actuator.

3. The apparatus of claim 1, further comprising:
a first bend in a top portion of each of the three flexor columns; and
a second bend in a bottom portion of each of the three flexor columns, wherein the first bend and the second bend form the C-shape for the spring actuator.

4. The apparatus of claim 3, further comprising:
the top section of the spring actuator includes two top wings each leading to a respective top flexor separated by a top gap; and
the bottom section of the spring actuator includes two bottom wings each leading to a respective bottom flexor separated by a bottom gap.

5. The apparatus of claim 4, further comprising:
two top stiffener wings positioned on opposing sides of the top section of the spring actuator, wherein each of the two top stiffener wings is bendable in an upward position or a downward position relative to a planar surface of the top section of the spring actuator.

6. The apparatus of claim 5, further comprising:
two bottom stiffener wings positioned on opposing sides of the bottom section of the spring actuator, wherein each of the two bottom stiffener wings is bendable in an upward position or a downward position relative to a planar surface of the bottom section of the spring actuator.

7. The apparatus of claim 1, wherein the first flexor column is in parallel with the second flexor column and the second flexor column is in parallel with the third flexor column.

8. The apparatus of claim 7, further comprising:
a first gap present between the first flexor column and the second flexor column; and
a second gap present between the second flexor column and the third flexor column.

9. The apparatus of claim 8, further comprising:
a first module gap between the first writer module and the reader module; and
a second module gap between the reader module and the second writer module.

10. The apparatus of claim 9, further comprising:
a first cable coupled to the first writer module;
a second cable coupled to the reader module; and
a third cable coupled to the second writer module.

11. The apparatus of claim 10, wherein the first cable and the second cable are routed through the first gap, and the third cable is routed through the second gap.

12. The apparatus of claim 11, wherein the first cable and the second cable do not contact one another.

13. The apparatus of claim 10, wherein the first cable is routed through the first gap, and the second cable and the third cable are routed through the second gap.

14. The apparatus of claim 13, wherein the second cable and the third cable do not contact one another.

15. The apparatus of claim 1, wherein the first writer module is bonded to the first flexor column at a first angle that is greater or less than zero relative to a planar surface of the second flexor column to which the reader module is bonded.

16. The apparatus of claim 1, wherein the second writer module is bonded to the first flexor column at a second angle that is greater than or less than zero relative to a planar surface of the second flexor column to which the reader module is bonded.

17. The apparatus of claim 1, wherein the first writer module is bonded to the first flexor column at a first angle that is greater or less than zero relative to a planar surface of the second flexor column to which the reader module is bonded and the second writer module is bonded to the first flexor column at a second angle that is greater than or less than zero relative to a planar surface of the second flexor column to which the reader module is bonded.

18. The apparatus of claim 17, wherein the first angle is not equal to the second angle.

19. The apparatus of claim 1, further comprising:
a top voice coil positioned above the reader module; and
a bottom voice coil positioned below the first writer module and the second writer module.

20. The apparatus of claim 19, wherein the top voice coil includes a top base leading to a top structure and the top structure is bonded to the reader module in an upper area.

21. The apparatus of claim 20, wherein the bottom voice coil includes a bottom base leading to a left structure and a right structure, the left structure is bonded to the first writer module in a lower area, and the right structure is bonded to the second writer module in the lower area.

22. The apparatus of claim 1, further comprising:
a top bender piezo actuator of a top section of the spring actuator configured to actuate the reader module bonded to the second flexor column; and
a bottom bender piezo actuator of a bottom section of the spring actuator configured to actuate the first writer module bonded to the first flexor column and the second writer module bonded to the third flexor column.

23. The apparatus of claim 22, further comprising:
a first member of the top bender piezo actuator connected to the first flexor column with the first writer module; and
a second member of the top bender piezo actuator connected to the third flexor column with the second writer module, wherein the first member and the second member are of a non-active piezo material.

24. The apparatus of claim 23, further comprising:
a third member of the bottom bender piezo actuator connected to the second flexor column with the reader module, wherein the third member is of a non-active piezo material.

25. The apparatus of claim 1, wherein the spring actuator is secured by clamps on a coarse motion elevator positioned between a first roller and a second roller in a tape drive.

* * * * *